United States Patent
Brand et al.

(10) Patent No.: US 10,373,632 B2
(45) Date of Patent: *Aug. 6, 2019

(54) HEAT-ASSISTED REMOVAL OF HEAD CONTAMINATION

(71) Applicant: Seagate Technology LLC, Cupertino, CA (US)

(72) Inventors: John L. Brand, Burnsville, MN (US); James D. Kiely, Edina, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/865,201

(22) Filed: Jan. 8, 2018

(65) Prior Publication Data
US 2018/0233166 A1 Aug. 16, 2018

Related U.S. Application Data

(63) Continuation-in-part of application No. 15/433,829, filed on Feb. 15, 2017.

(51) Int. Cl.
| | | |
|---|---|---|
| G11B 5/31 | (2006.01) | |
| G11B 5/71 | (2006.01) | |
| G11B 5/82 | (2006.01) | |
| G11B 5/667 | (2006.01) | |
| G11B 5/41 | (2006.01) | |
| G11B 5/725 | (2006.01) | |
| G11B 5/00 | (2006.01) | |

(52) U.S. Cl.
CPC .......... *G11B 5/3133* (2013.01); *G11B 5/3116* (2013.01); *G11B 5/3146* (2013.01); *G11B 5/41* (2013.01); *G11B 5/667* (2013.01); *G11B 5/71* (2013.01); *G11B 5/725* (2013.01); *G11B 5/82* (2013.01); *G11B 2005/0021* (2013.01)

(58) Field of Classification Search
None
See application file for complete search history.

(56) References Cited

U.S. PATENT DOCUMENTS

| | | |
|---|---|---|
| 6,307,832 B1 | 10/2001 | Novotny et al. |
| 6,416,839 B1 | 7/2002 | Xuan et al. |
| 6,602,570 B1 | 8/2003 | Ma et al. |
| 6,627,302 B1 | 9/2003 | Tang et al. |
| 6,800,349 B2 | 10/2004 | Ma et al. |
| 7,355,814 B1 | 4/2008 | Fowler et al. |

(Continued)

OTHER PUBLICATIONS

James D. Kiely, Paul M. Jones, Y.Yang, John L. Brand, Manuel Anaya-Dufresne, Patrick C. Fletcher, Florin Zavaliche, Yvete Toivola, John C. Duda, and Michael T. Johnson, "Write-Induced Head Contamination in Heat-Assisted Magnetic Recording", TMRC 2016 Presentation, pp. 1-18, Seagate Technology.

(Continued)

*Primary Examiner* — Jefferson A Evans

(57) ABSTRACT

Provided herein is a magnetic write head including a near field transducer and a magnetic recording media including a media lubricant. The media lubricant includes a first portion and a second portion. The second portion of the media lubricant is evaporated in response to heat emitted from the near field transducer. The second portion of the media lubricant that is evaporated removes a contaminant over the near field transducer.

20 Claims, 5 Drawing Sheets

(56) References Cited

U.S. PATENT DOCUMENTS

| | | | |
|---|---|---|---|
| 7,914,845 B2* | 3/2011 | Reiter | G11B 5/8408 427/128 |
| 8,064,311 B2 | 11/2011 | Holbrook et al. | |
| 8,152,972 B2* | 4/2012 | Iwata | B82Y 10/00 204/192.12 |
| 8,910,338 B2 | 12/2014 | Nagata et al. | |
| 9,245,542 B1 | 1/2016 | Fernandez et al. | |
| 9,437,221 B2 | 9/2016 | Lee et al. | |
| 9,950,980 B2* | 4/2018 | Shimizu | C07C 43/137 |
| 10,204,655 B1* | 2/2019 | Ma | G11B 21/106 |
| 2006/0105203 A1* | 5/2006 | Li | C23C 14/044 428/833 |
| 2008/0171234 A1* | 7/2008 | Imamura | G11B 5/725 428/827 |
| 2009/0297887 A1* | 12/2009 | Liu | G11B 5/725 428/833.3 |
| 2010/0020444 A1 | 1/2010 | Kubotera et al. | |
| 2010/0104742 A1 | 4/2010 | Guo et al. | |
| 2010/0149692 A1 | 6/2010 | Fujimaki et al. | |
| 2010/0195240 A1 | 8/2010 | Nakakawaji et al. | |
| 2010/0232071 A1 | 9/2010 | Ogata et al. | |
| 2013/0194901 A1* | 8/2013 | Kanbe | G11B 5/7325 369/13.24 |
| 2014/0177405 A1* | 6/2014 | Rejda | G11B 5/102 369/13.02 |
| 2015/0132503 A1 | 5/2015 | Kautzky et al. | |
| 2015/0179216 A1 | 6/2015 | Engelkes et al. | |
| 2016/0217816 A1* | 7/2016 | Sayama | G11B 5/65 |
| 2016/0329074 A1* | 11/2016 | Karis | G11B 5/725 |
| 2017/0221511 A1* | 8/2017 | Dai | G11B 5/41 |

OTHER PUBLICATIONS

R. Ikkawi, N. Amos, A. Lavrenov, A. Krichevsky, D. Teweldebrhan, S. Ghosh, A.A. Balandin, D. Litvinov, and S. Khizroev, "Near-Field Optical Transducer for Heat-Assisted Magnetic Recording for Beyond-10-Tbit/in2 Densities", Journal of Nanoelectronic and Optoelectronics, vol. 3, pp. 44-54, American Scientific Publishers 2008, USA.

S.K. Deb Nath and Chee How Wong, "Study of the Thermal Decomposition of PFPEs Lubricants on a Thin DLC Film Using Finitely Extensible Nonlinear Elastic Potential Based Molecular Dynamics Simulation", Journal of Nanotechnology, DOI 10.1155/2014/290834, 2014.

N. Tagawa, H. Tani, H. Asada, R. Lu, and S. Koganezawa, "Decomposition of Perfluoropolyether Lubricant on Air-Bearing Surfaces During Heat-Assisted Magnetic Recording", IEEE Transactions on Magnetics, V 53, Mar. 2017, DOI 10.1109/TMAG.2016.2627532.

Rong Ji, Yansheng Ma, Jack Wen Huei Tsai, "Studies of Degradation and Decomposition Mechanisms of High Temperature Lubricants Undergoing Laser Irradiation", IEEE Transactions on Magnetics, V 48, p. 4475, Oct. 2012.

* cited by examiner

900

┌─────────────────────────────────────────────────────────────┐
│ HEATING A FIRST REGION OF A MAGNETIC RECORDING MEDIA WITH A │
│   NEAR FIELD TRANSDUCER, WHEREIN THE HEATING CAUSES A       │
│   CONTAMINANT TO FORM OVER THE NEAR FIELD TRANSDUCER        │
│                            902                               │
└─────────────────────────────────────────────────────────────┘
                              │
┌─────────────────────────────────────────────────────────────┐
│  HEATING A SECOND REGION OF THE MAGNETIC RECORDING MEDIA    │
│ WITH THE NEAR FIELD TRANSDUCER, WHEREIN THE SECOND REGION   │
│  IS EVAPORATED IN RESPONSE TO THE HEATING, AND THE SECOND   │
│  REGION THAT IS EVAPORATED REMOVES THE CONTAMINANT OVER     │
│               THE NEAR FIELD TRANSDUCER                     │
│                            904                               │
└─────────────────────────────────────────────────────────────┘

FIG. 9

HEAT-ASSISTED REMOVAL OF HEAD CONTAMINATION

CROSS-REFERENCE TO RELATED APPLICATIONS

This application is a continuation-in-part of prior application Ser. No. 15/433,829, filed Feb. 15, 2017.

BACKGROUND

Continuous device downscaling, growing integration densities of nanoscale electronics, and development of alternative information processing paradigms are just a few of the technologies driving a desire to increase data storage capacity. One solution to increase data storage capacity are heat-assisted magnetic recording systems which use near-field optical transducers to heat magnetic recording layers during writing operations. As a result, heat assisted magnetic recording systems use not only magnetic but also thermal energy. Such heat assisted magnetic recording systems use recording media with magnetic recording layers having substantially higher anisotropy in order to achieve ultra-high recording densities. As a result, thermal management of media thin films is an important aspect of heat-assisted magnetic recording.

SUMMARY

Provided herein is a magnetic write head including a near field transducer and a magnetic recording media including a media lubricant. The media lubricant includes a first portion and a second portion. The second portion of the media lubricant is evaporated in response to heat emitted from the near field transducer. The second portion of the media lubricant that is evaporated removes a contaminant over the near field transducer. These and various other features and advantages will be apparent from a reading of the following detailed description.

BRIEF DESCRIPTION OF DRAWINGS

FIG. 9 shows an exemplary flow diagram for removing head contaminants according to one aspect of the present embodiments.

DESCRIPTION

Figure 1:
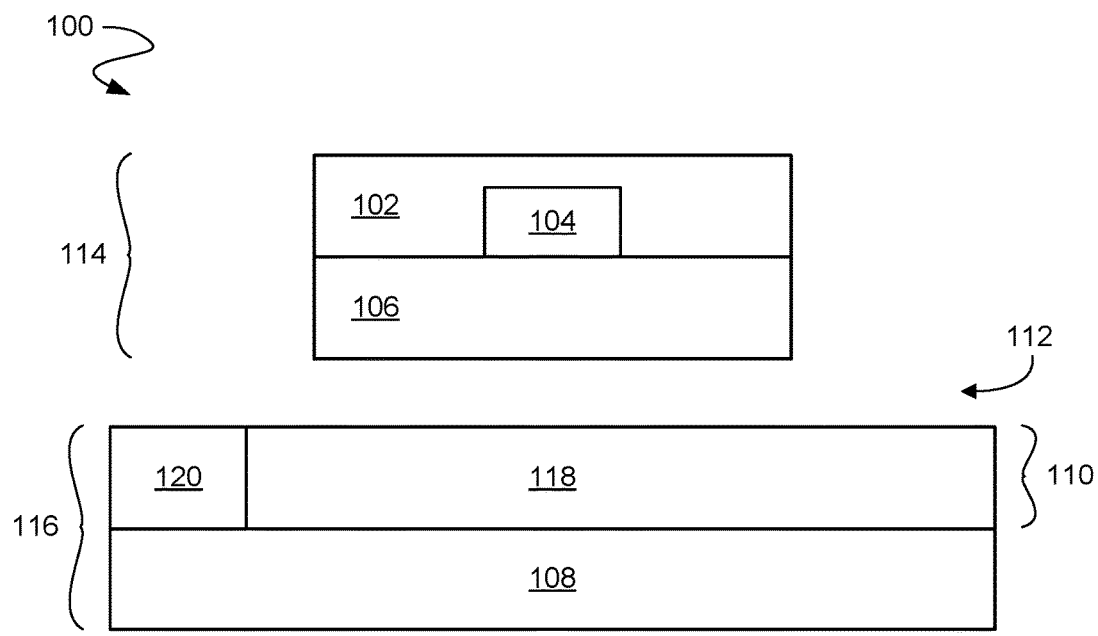
FIG. 1 shows a drive system including a magnetic write head with a near field transducer and a media lubricant with a first portion and a second portion according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Terms such as "over," "overlying," "above," "under," etc. are understood to refer to elements that may be in direct contact or may have other elements in-between. For example, two layers may be in overlying contact, wherein one layer is over another layer and the two layers physically contact. In another example, two layers may be separated by one or more layers, wherein a first layer is over a second layer and one or more intermediate layers are between the first and second layers, such that the first and second layers do not physically contact.

Heat assisted magnetic recording ("HAMR") systems locally heat a recording medium (e.g. a disk) to temporarily reduce the coercivity (e.g. magnetically soften) of the magnetic medium. The reduced coercivity of the magnetic medium allows magnetic writing fields to more easily write to magnetic layers within the medium during the temporary magnetic softening caused by a heat source. Once the heated magnetic medium cools to ambient temperature, the coercivity returns to a sufficiently high value to ensure magnetic stability of the recorded information. As a result, HAMR allows for the use of small grain media, with a larger magnetic anisotropy at room temperature to assure sufficient stability for recording at increased areal densities. HAMR can be applied to any type of magnetic storage media including (but not limited to) tilted media, longitudinal media, perpendicular media, and patterned media.

Various HAMR systems use a near field transducer within the drive read/write head to generate the heat used during writing processes. However, the high temperatures generated by the near field transducer can cause contaminants to quickly cover the near field transducer. The contaminants may continue to grow, covering larger and larger areas of the drive read/write head. As such, the contaminants form a contaminated area that causes problems including (but not limited to) a loss of coupling efficiency between the drive head and the magnetic medium and a degradation of recording performance. As the contaminated area continues to expand, it may quickly grow large enough to contact and damage the magnetic medium, thereby causing the drive to fail.

In order to solve these problems, significant effort has been directed to designing lubricants with high thermal and mechanical robustness, which are not affected by the intense heat generated by the near field transducer. However, in the embodiments described herein it has been unexpectedly discovered that using a media lubricant that is susceptible to damage in the form of, for example, controllable out-diffusion may surprisingly prevent degradation of the recording performance.

Referring now to FIG. 1, it is understood that the Figures presented herein are figurative representations of a disk drive system 100, wherein information is magnetically written to a disk drive magnetic storage medium (e.g. a disk) with at least one disk drive head (e.g. a read/write head). For clarity of illustration, elements and designs of the disk drive system 100 have been greatly simplified, sizes altered, and relative dimensions also altered. For example, media and head layers are not illustrated as well as many head components (e.g. write pole, return pole, actuators, etc.). For example, media layers may include at least a substrate, soft underlayer(s), seed layer(s), heat sink(s) (continuous or patterned), recording layer(s) (continuous or patterned), overlayer(s), etc. Likewise the drive head may also include many layers. It is understood that embodiments described herein include any disk drive HAMR system with a near field transducer and a media lubricant.

The disk drive system 100 includes a media facing portion 102 of the drive read/write head with a near field transducer 104 and a head over-coat 106 (e.g. overlying head over-coat in various orientations, underlying over-coat in other orientations, etc.). One of the functions of the head over-coat 106 is to protect the media facing portion 102 including the near field transducer 104. As such, the head over-coat 106 is on the media facing portion 102 with the near field transducer 104. For clarity of description, the head over-coat 106 and the media facing portion 102 are described separately. However, it is understood that various designs may include the head over-coat 106 as part of the media facing portion 102, and embodiments described herein include such designs.

The disk drive system 100 also includes a drive media 108 with a media lubricant 110 (e.g. overlying media lubricant in various orientations, underlying lubricant in other orientations, etc.). In various embodiments, the media lubricant 110 may also be referred to as a lubrication layer. One of the functions of the media lubricant 110 is to protect the drive media 108. In addition, the media lubricant 110 interacts with the head over-coat 106 to form an air bearing 112 between a magnetic write head 114 (including at least the media facing portion 102, the near field transducer 104, and the head over-coat 106) and a magnetic recording media 116 (including at least the drive media 108 and the media over-coat 110). In some embodiments, the magnetic write head assembly may include various combinations of one or more of a read sensor, write pole, heater elements, near field transducer, laser light source, and other magnetic write head elements. In various embodiments, the interaction of the media lubricant 110 with the head over-coat 106 occurs when the magnetic recording media 116 with the media lubricant 110 is rotated with respect to the near field transducer 104, resulting in the formation of the air bearing 112.

As discussed above, the heat generated by the near field transducer 104 in HAMR drive systems can cause contaminants to buildup on the magnetic write head 114. The effects of such contamination can lead to damage of the media lubricant 110, degradation of drive performance, and eventual drive failure. Sources of contamination may originate from many areas of the disk drive system 100, including (but not limited to): surface contaminants, head components, ambient gas, drive components, preexisting contaminants within the drive, etc. It is understood that other heat generation sources (e.g. laser) may be used in the disk drive system 100 for HAMR processes.

Instead of increasing the robustness of the lubricant to resist heat damage, embodiments described herein engineer the media lubricant 110 to be controllably susceptible to heat initiated out-diffusion (e.g. evaporation) in order to reduce and/or prevent detrimental effects to the disk drive system 100. As such, in embodiments described herein the media lubricant 110 includes a first portion 118 (e.g. a first region) and a second portion 120 (e.g. a second region).

The first portion 118 of the media lubricant 110 is a HAMR-robust lubricant that is designed to withstand the heat generated by the near field transducer 104. However, the second portion 120 of the media lubricant 110 is designed to be thermally reactive and decompose at lower temperatures than the HAMR-robust lubricant. The thermal decomposition of the second portion 120 produces products (e.g. through evaporation, outgassing, etc.) that chemically react with and remove buildup (e.g. contaminants) on the magnetic write head 114. As such, the second portion 120 of the media lubricant 110 is designed and configured to evaporate in response to the heat emitted from the near field transducer 104, and the evaporated second portion of the media lubricant 110 removes contaminant over the near field transducer 104.

An example of the second portion 120 may include a polymer backbone and polymer endgroups. The backbone can be less robust the shorter the backbone length and the less the backbone interacts with the surface. One non-limiting backbone example is perfluoropolyether (PFPE) backbone that is a z-backbone —$(CF2O)$—$(CF2CF2O)n$-. A backbone with less bonding is the D-backbone —$(CF2CF2CF2O)m$-. There may be many different endgroups that may be selected to interact with the surface and decompose different contaminants. One example endgroup is -tetraol (also known as 4OH) with 2 hydroxyl groups on each end. Another example endgroup is -dol (aka 2OH) with 1 hydroxyl group on each end. An example of a mixture of a thermally robust lubricant with a lubricant prone to decomposition under HAMR conditions would be a z-tetraol lube with a molecular weight of 5000 and a D-2OH lube with a molecular weight of 2000. It is understood that these are merely exemplary and other lubricants may be used.

Figure 2:
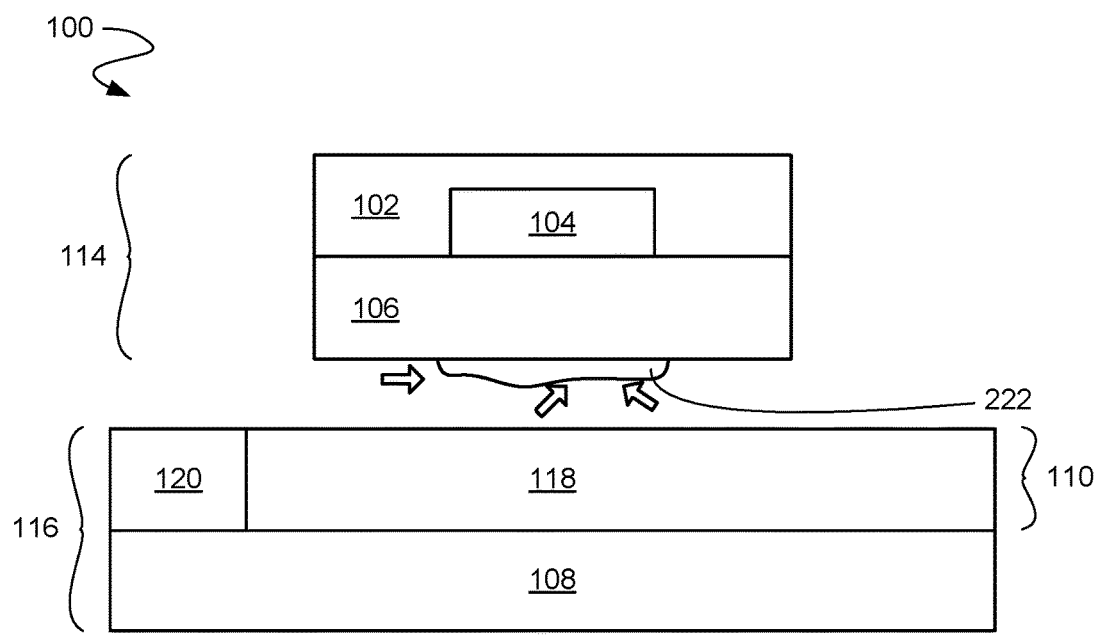
FIG. 2 shows contaminants on the magnetic write head according to one aspect of the present embodiments.

Referring now to FIG. 2, contaminants 222 on the magnetic write head 114 are shown according to one aspect of the present embodiments. As previously discussed, during drive operation the magnetic write head 114 is adjacent to the magnetic recording media 116. The near field transducer 104 generates heat that causes the contaminants 222 to deposit and buildup on the magnetic write head 114 and overlay the near field transducer 104. As discussed above, the contaminants 222 may lead to drive problems and eventual drive failure.

In various embodiments, the size (e.g. width and thickness) of the contaminants 222 may be different. For example, the contaminants 222 may completely cover the near field transducer 104 and may cover other portions of the magnetic write head 114. In various embodiments, buildup of the contaminants 222 may spread to other areas of the magnetic write head 114. On the other hand, the contaminants 222 may only partially cover the near field transducer 104. It is understood that the contaminants 222 may buildup over or near the near field transducer 104. In some embodiments, the contaminants 222 may buildup on one or more layers of the magnetic write head 114 between the near field transducer 104 and the magnetic recording media 116. In some embodiments the contaminants 222 may buildup directly on the near field transducer 104, where one or more layers are not present between the near field transducer 104 and the magnetic recording media 116.

Figure 3:
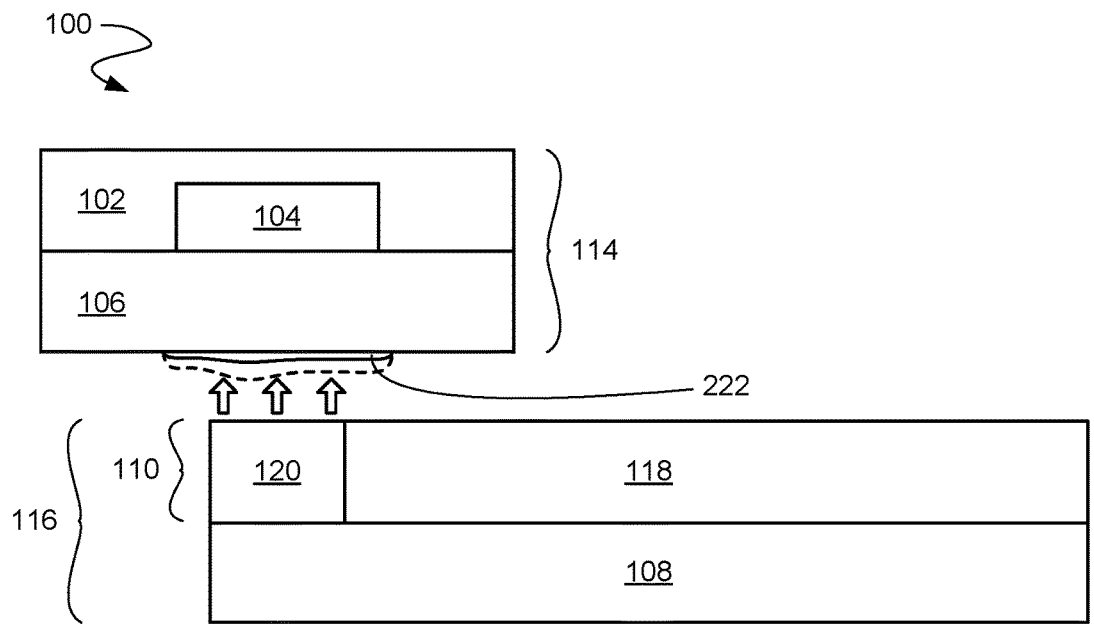
FIG. 3 shows removal of the contaminants on the magnetic write head according to one aspect of the present embodiments.

Referring now to FIG. 3, removal of the contaminants 222 on the magnetic write head 114 is shown according to one aspect of the present embodiments. In order to clean the contaminants 222 over the near field transducer 104, the magnetic write head 114 may position itself over or near the second portion 120 of the media lubricant 110. As discussed above the heat generated by the magnetic write head 114 causes the second portion 120 of the media lubricant 110 to decompose. The thermal decomposition of the second portion 120 produces products (e.g. hydrofluoric acid) that chemically react with and remove contamination on the magnetic write head 114. Contaminants include, but are not limited to, $SiO_2$, $Al_2O_3$, SiN, silicon-containing compounds, and hydrocarbons.

As illustrated by the dotted line (representing the size of the contaminants 222 before removal/cleaning), the size and volume of the contaminants 222 is greatly reduced as a result of the evaporation of the second portion 120. In embodiments described herein, this process is controllable (e.g. by tuning the heat generated and absorbed in the media lubricant 110, or by materials selections) in order to keep the air bearing 112 free of the contaminants 222 that have condensed over the near field transducer 104.

As such, a repetitive cycle of contamination buildup and removal occurs with the contaminants 222 and the second portion 120 of the media lubricant 110. The buildup and removal cycle keeps the air bearing 112 free of the contaminants 222. In doing so, the HAMR head does not physically contact the HAMR media because the growth and reduction of the contaminants 222 is controlled. Such a controlled growth and reduction not only prevents the HAMR drive from crashing, but it also maintains desirable read/write functionality by keeping areas (e.g. read and write poles) of the magnetic write head 114 free of contamination.

As previously discussed, the figures and elements in the figures are not drawn to scale and relative sizes are greatly distorted for clarity of illustration. Therefore it is understood that the evaporation of the media lubricant 110 is very small and not a significant volume that will negatively impact the operation of the disk drive system 100. Furthermore in various embodiments, the out-diffusion, or thermal-induced desorption process, is confined to the area of the heat spot (approximately of the same size as the near field transducer 104), resulting in a small localized desorption from the media lubricant 110. As a consequence, the volume of the media lubricant 110 is large enough (in comparison to the very small localized heat spot) that the loss of media lubricant 110 over the life of the drive does not negatively impact performance.

Figure 4:
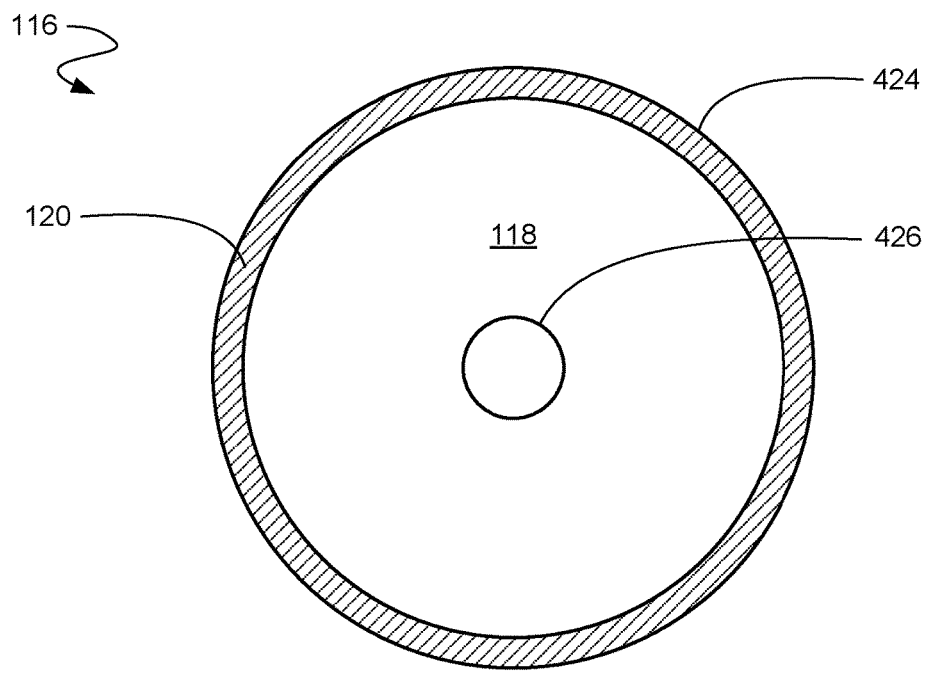
FIG. 4 shows a top view of the magnetic recording media with the second portion at an outer diameter according to one aspect of the present embodiments.

Referring now to FIG. 4, a top view of the magnetic recording media 116 with the second portion 120 at an outer diameter 424 is shown according to one aspect of the present embodiments. The magnetic recording media 116 includes an inner diameter 426 and the outer diameter 424. In various embodiments the second portion 120 is positioned at the outer diameter 424. As such, the first portion 118 is positioned between the second portion 120 and the inner diameter 426. It is understood that the size of the second portion 120 is merely illustrative, and the second portion 120 may be smaller or bigger. For example, the second portion 120 may cover a smaller or larger area than the first portion 118. In another example, the second portion 120 may cover less than half, greater than half, or more than half of the magnetic recording media 116.

Figure 5:
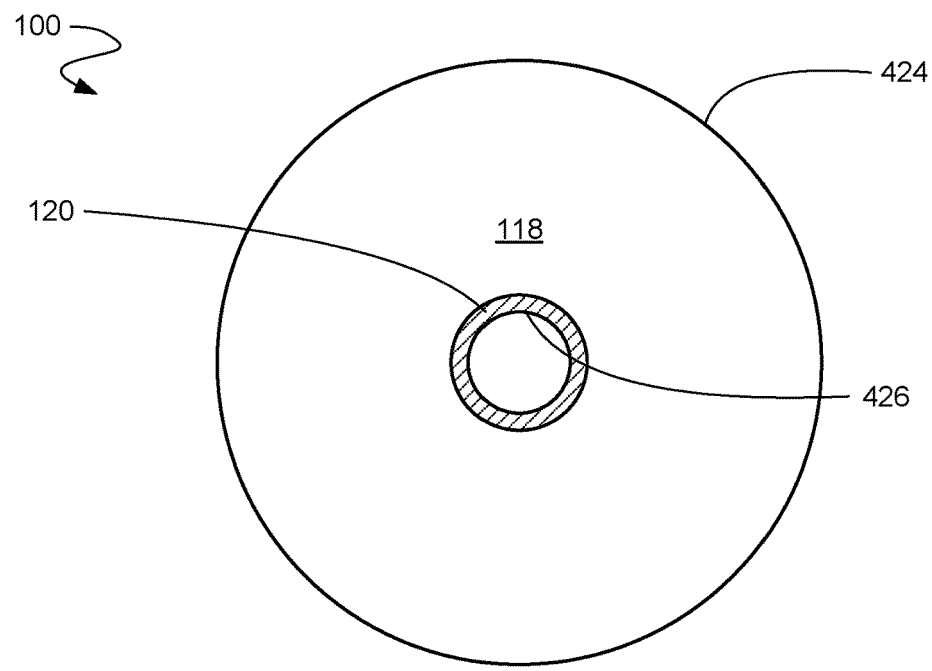
FIG. 5 shows a top view of the magnetic recording media with the second portion at the inner diameter according to one aspect of the present embodiments.

Referring now to FIG. 5, a top view of the magnetic recording media 116 with the second portion 120 at the inner diameter 426 is shown according to one aspect of the present embodiments. In various embodiments the second portion 120 is positioned at the inner diameter 426. As such, the first portion 118 is positioned between the second portion 120 and the outer diameter 424. It is understood that the size of the second portion 120 is merely illustrative, and the second portion 120 may be smaller or bigger (as discussed above).

Figure 6:
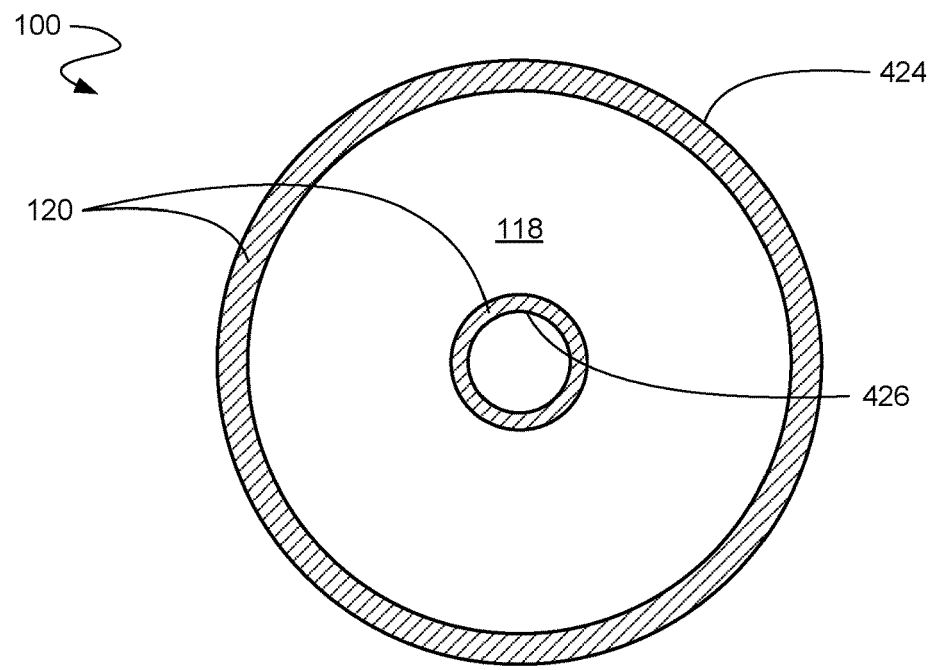
FIG. 6 shows a top view of the magnetic recording media with the second portion at the outer diameter and the inner diameter according to one aspect of the present embodiments.

Referring now to FIG. 6, a top view of the magnetic recording media 116 with the second portion 120 at the outer diameter 424 and the inner diameter 426 is shown according to one aspect of the present embodiments. In various embodiments the second portion 120 is positioned both at the outer diameter 424 and the inner diameter 426. As such, the first portion 118 is positioned between the second portion 120 at the outer diameter 424 and the second portion 120 at the inner diameter 426. It is understood that the size of the second portion 120 is merely illustrative, and the second portion 120 may be smaller or bigger (as discussed above).

In various embodiments the first portion 118 positioned at the outer diameter 424 (e.g. an outer diameter removal region) may remove contamination buildup differently than the second portion 120 positioned at the inner diameter 426 (e.g. an inner diameter removal region). For example, the inner diameter removal region may reach a higher temperature than the outer diameter removal region, thereby releasing more material and removing more contamination. In another example, the inner and outer diameter removal regions may include different thermally reactive materials (e.g. different thermally decomposing lubricant) for different types of contamination removal. In a further embodiment, the inner diameter region may evaporate at a higher temperature than the outer diameter region. It is understood that these examples are non-limiting, and embodiments may include any difference between the inner diameter removal region and outer diameter removal region.

Figure 7:
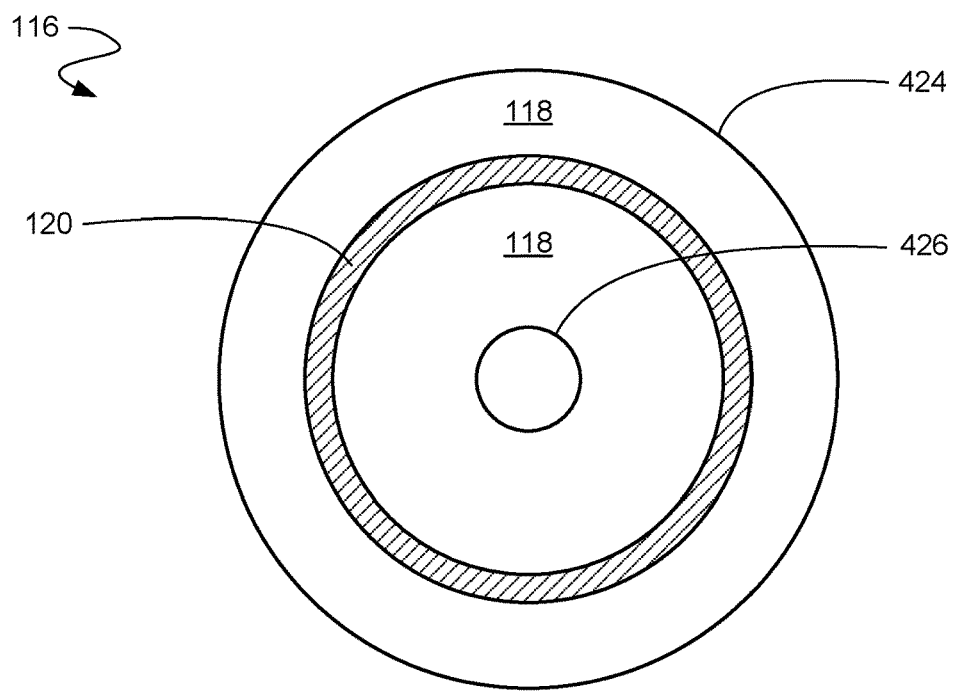
FIG. 7 shows a top view of the magnetic recording media with the second portion between the outer diameter and the inner diameter according to one aspect of the present embodiments.

Referring now to FIG. 7, a top view of the magnetic recording media 116 with the second portion 120 between the outer diameter 424 and the inner diameter 426 is shown according to one aspect of the present embodiments. In various embodiments the second portion 120 is positioned between the outer diameter 424 and the inner diameter 426, and does not reach either the outer diameter 424 or the inner diameter 426. As such, the first portion 118 is positioned between the outer diameter 424 and the second portion 120. In addition, the first portion 118 is positioned between the inner diameter 426 and the second portion 120. It is understood that the size of the second portion 120 is merely illustrative, and the second portion 120 may be smaller or bigger (as discussed above).

Figure 8:
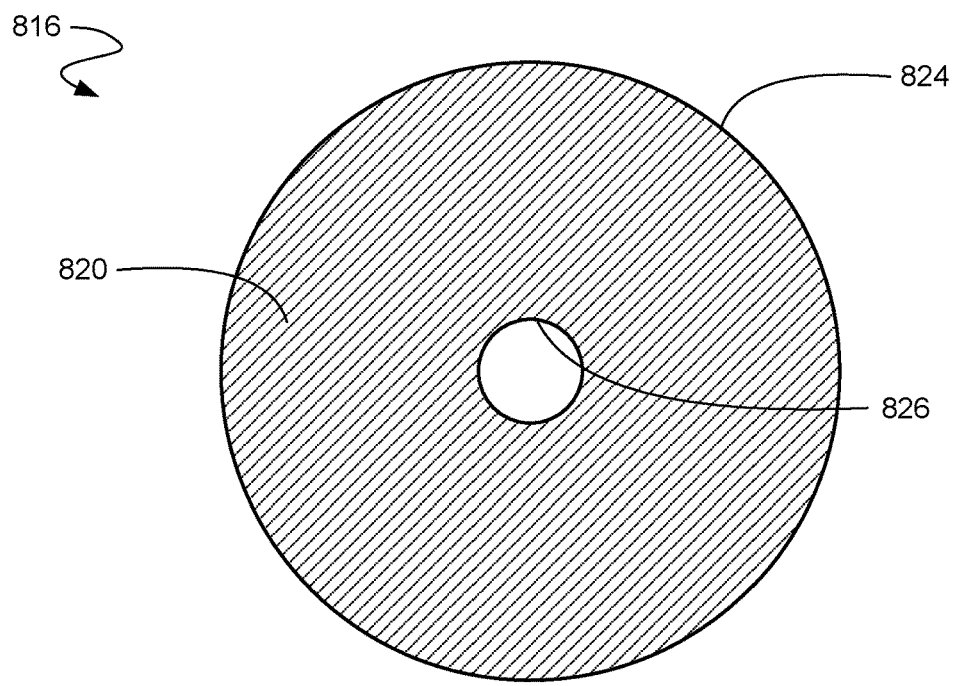
FIG. 8 shows a top view of a magnetic recording media with overlapping first and second portions according to one aspect of the present embodiments.

Referring now to FIG. 8, a top view of a magnetic recording media 816 with overlapping first and second portions 820 is shown according to one aspect of the present embodiments. In various embodiments the previously described first and second portions are co-deposited over an entire the entire magnetic recording media 816, between an outer diameter 824 and an inner diameter 826. As such, the first region and second region described above both cover an entire surface of the magnetic recording media 816. Therefore, the cleaning effect of the thermally decomposable lubricant occurs continuously during write operations.

In various embodiments, the first portion may overlap the second portion, the second portion may overlap the first portion, or the first and second portions may be evenly mixed together into one layer. In further embodiments, gradients of the first portion and second portion may be formed across the magnetic recording media 816. In such gradient embodiments, concentrations of the first or second portion may increase/decrease from the inner diameter 826 to outer diameter 824 or from the outer diameter 824 to the inner diameter 826.

Although FIGS. 4-8 describe one or two portions of the first portion 118 and the second portion 120, various embodiments may include any number of first portions 118 and second portions 120 and/or any combination(s) of the Figures. For example, an embodiment may include multiple rings of second portions 120 separating multiple rings of first portions 118. In another example, FIGS. 6 and 7 may be combined to include an outer diameter second portion, inner diameter second portion, and middle diameter second portion. In a further example, FIGS. 6 and 8 may be combined to include continuous removal of contaminant with increased cleaning at the outer and inner diameters. As such, the combinations, arrangements, and sizes of the first portion (s) 118 and second portion(s) 120 are not limited.

FIG. 9 shows an exemplary flow diagram for removing head contaminants according to one aspect of the present embodiments. At block 902, a first region of a magnetic recording media is heated with a near field transducer. The heating causes a contaminant to form over the near field transducer. For example, in FIG. 2 near field transducer generates heat that causes the contaminants to buildup on the magnetic write head and overlay the near field transducer.

At block 904, a second region of the magnetic recording media is heated with the near field transducer. The second region is evaporated and removes the contaminant over the near field transducer. For example, in FIG. 3 heat generated by the magnetic write head causes the second portion of the media lubricant to decompose. The thermal decomposition of the second portion produces products that chemically react with and remove contamination on the magnetic write head.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. An apparatus comprising:
    a magnetic write head including a near field transducer and a write pole; and
    a magnetic recording media including a media lubricant, wherein
        the media lubricant includes a first portion and a second portion,
        the second portion of the media lubricant is evaporated in response to heat emitted from the near field transducer, and
        the second portion of the media lubricant that is evaporated removes a contaminant over the near field transducer.

2. The apparatus of claim 1, wherein the second portion of the media lubricant is at an outer diameter of the magnetic recording media.

3. The apparatus of claim 1, wherein the second portion of the media lubricant is at an inner diameter of the magnetic recording media.

4. The apparatus of claim 1, wherein the first portion of the media lubricant and the second portion of the media lubricant overlap.

5. The apparatus of claim 1, wherein the second portion of the media lubricant is between an inner diameter and an outer diameter of the magnetic recording media.

6. The apparatus of claim 1, wherein the second portion of the media lubricant includes a thermally reactive lubricant.

7. The apparatus of claim 1, wherein the second portion of the media lubricant includes an outer diameter region and an inner diameter region, and the outer diameter region includes a different thermally reactive lubricant than the inner diameter region.

8. An apparatus comprising:
    a first region of a magnetic recording media; and
    a second region of the magnetic recording media that is evaporated in response to heat emitted from a near field transducer on a write head including a write pole, wherein the second region that is evaporated removes contaminants over the near field transducer.

9. The apparatus of claim 8, wherein the second region of the magnetic recording media is at an outer diameter of the magnetic recording media.

10. The apparatus of claim 8, wherein the second region of the magnetic recording media is at an inner diameter of the magnetic recording media.

11. The apparatus of claim 8, wherein the first region of the magnetic recording media and the second region of the magnetic recording media both cover an entire surface of the magnetic recording media.

12. The apparatus of claim 8, wherein the second region of the magnetic recording media is between an inner diameter and an outer diameter of the magnetic recording media.

13. The apparatus of claim 8, wherein the second region of the magnetic recording media includes an outer diameter region and an inner diameter region, and the inner diameter region evaporates at a higher temperature than the outer diameter region.

14. The apparatus of claim 8, wherein the first region of the magnetic recording media includes surface contaminants that are evaporated in response to the heat emitted from the near field transducer.

15. A method comprising:
heating a first region of a magnetic recording media with a near field transducer on a write head including a write pole, wherein the heating causes a contaminant to form over the near field transducer; and
heating a second region of the magnetic recording media with the near field transducer, wherein
the second region is evaporated in response to the heating, and
the second region that is evaporated removes the contaminant over the near field transducer.

16. The method of claim 15, wherein the second region of the magnetic recording media is at an outer diameter of the magnetic recording media or an inner diameter of the magnetic recording media.

17. The method of claim 15, wherein the first region of the magnetic recording media and the second region of the magnetic recording media overlap.

18. The method of claim 15, wherein the second region of the magnetic recording media is between an inner diameter and an outer diameter of the magnetic recording media.

19. The method of claim 15, wherein the second region of the magnetic recording media includes an outer diameter region and an inner diameter region, and the inner diameter region evaporates at a higher temperature than the outer diameter region.

20. The method of claim 15, wherein the second region of the magnetic recording media includes an outer diameter region and an inner diameter region, and the outer diameter region includes a different thermally decomposing lubricant than the inner diameter region.

* * * * *